Sept. 25, 1951  W. L. DE WITT  2,569,295
COMPUTING INSTRUMENT
Filed May 27, 1950  2 Sheets-Sheet 1
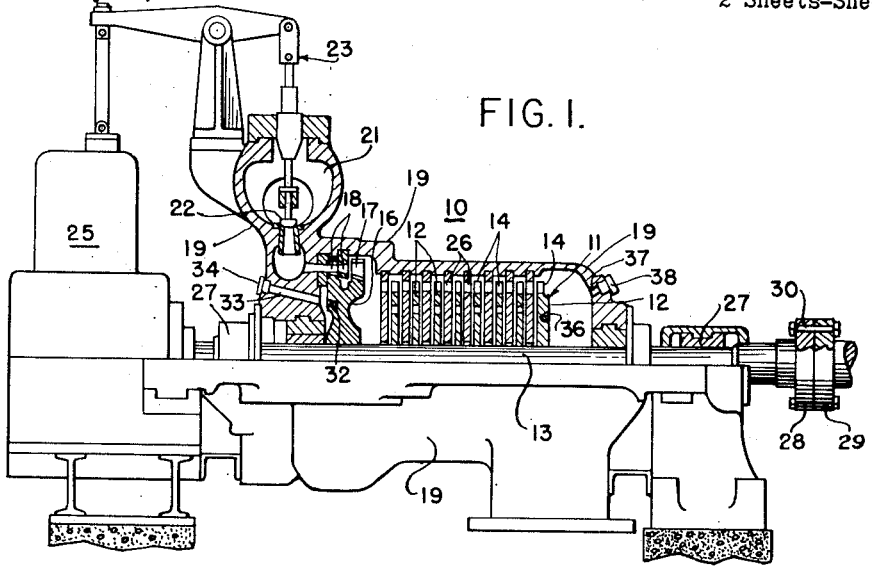
FIG. I.
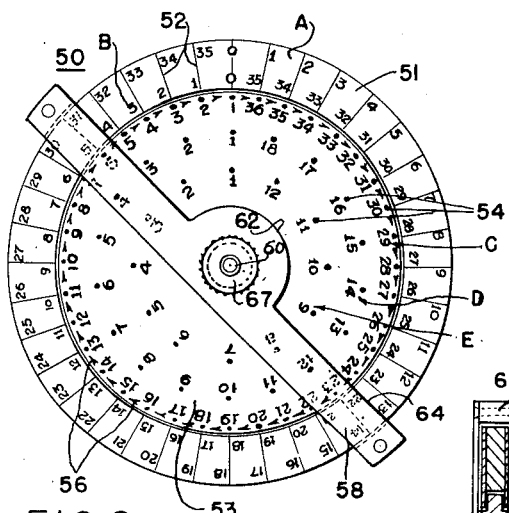
FIG. 2.
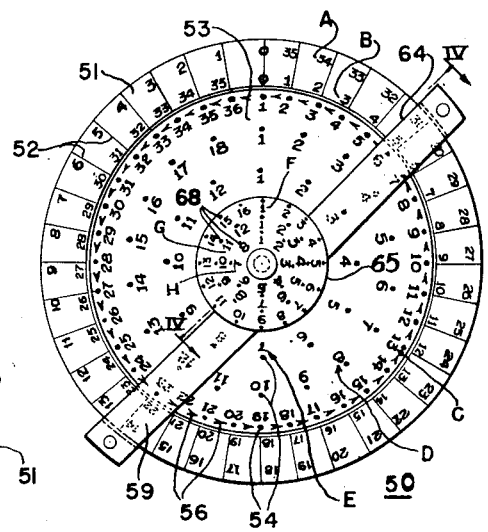
FIG. 3.
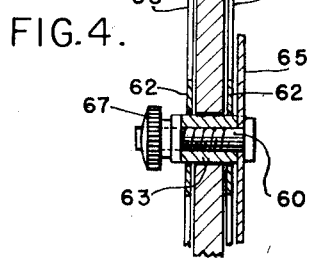
FIG. 4.
WITNESSES:
D. J. McCarty
E. H. Lutz
INVENTOR
WILLIAM L. DeWITT
BY
Robert T. French
ATTORNEY Sept. 25, 1951 W. L. DE WITT 2,569,295
COMPUTING INSTRUMENT
Filed May 27, 1950 2 Sheets-Sheet 2

WITNESSES:
D. J. McCarty
E. H. Lutz

INVENTOR
WILLIAM L. DeWITT
BY
Robert T. French
ATTORNEY

Patented Sept. 25, 1951

2,569,295

UNITED STATES PATENT OFFICE 2,569,295

COMPUTING INSTRUMENT

William L. De Witt, Upper Darby, Pa.

Application May 27, 1950, Serial No. 164,662

2 Claims. (Cl. 235—61)

This invention relates to instruments for quickly and accurately determining in which hole, of an annular series of balance plug holes in a rotor to be balanced, a balance plug should be placed.

While the present invention may be utilized in balancing numerous types of rotatable bodies, it has particular utility and advantages in the balancing of the rotors of all types of turbines, for example steam turbines of turbo-generator sets.

Present day steam turbines for power generation operate at temperatures in the vicinity of 1050° F. and are provided by the manufacturer with means for correcting or eliminating any rotor unbalance which may exist in the turbine or develop therein as a result of the high operating temperature or for any other reason.

This means provided by the manufacturer consists of two annular series of openings, one series in each end face of the rotor body. A single access opening is provided in each end wall of the turbine casing, the access openings being coaxial with respect to each opening of the annular series of openings in turn as the rotor is revolved.

Consequently, when an unbalance of a rotor occurs, the amount thereof may be determined by well known methods and/or apparatus and a plug of proper weight threaded into one of the openings of the annular series to counteract the unbalance. Obviously, the rotor must be turned until the proper balance plug opening is directly in line with the associated access opening. Inasmuch as there may be as many as thirty-six, or even more, balance plug openings in each annular series, determination and location of the correct balance plug opening has previously involved considerable mathematical calculation to determine the number of the proper opening, plus trial and error methods to find the opening after calculation.

With the aid of an instrument constructed in accordance with the present invention, the number of the proper balance plug opening may be quickly determined and located for alignment with the associated access opening.

Accordingly, an object of the invention is to provide an instrument for determining in which opening, of an annular series of openings, a balance plug should be inserted.

A further object of the invention is to provide an instrument for locating a predetermined balance plug opening relative to an associated access opening, when the balance plug openings are concealed by a casing surrounding the rotor having the balance plug openings.

These and other objects are effected by the present invention as will be apparent from the following description and claims, taken in accordance with the accompanying drawings, in which:

Fig. 1 is a schematic side elevational view, partially in section, of a conventional steam turbine, in the balancing of whose rotor the present invention could be utilized;

Fig. 2 is an elevational view of one side of an instrument constructed in accordance with the present invention;

Fig. 3 is a view similar to Fig. 2, but showing the opposite side of the same instrument;

Fig. 4 is an enlarged fragmentary sectional view, taken along the line IV—IV of Fig. 3, looking in the direction indicated by the arrows.

Figure 5:
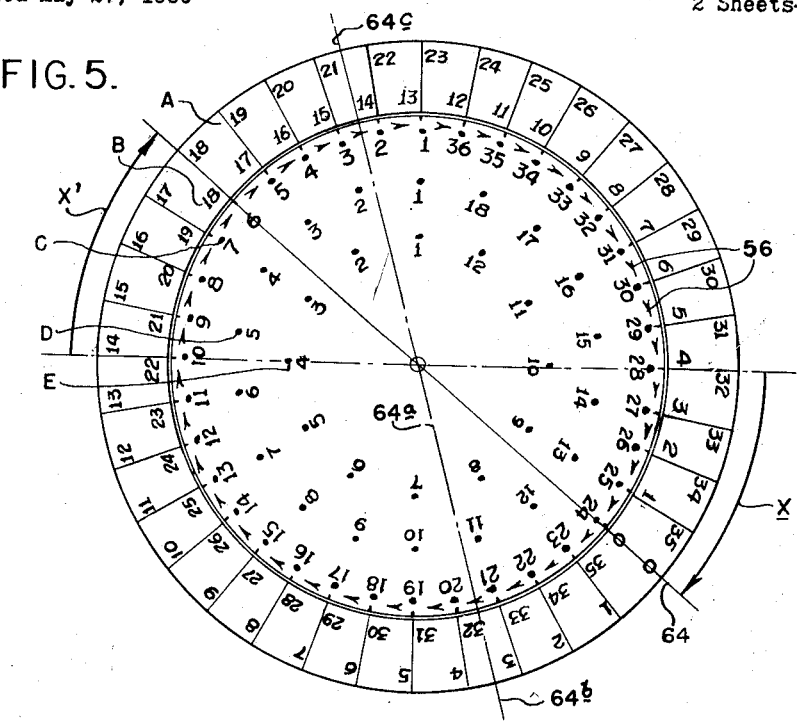
Figs. 5 and 6 are schematic views corresponding to Figs. 2 and 3, respectively, and illustrating examples of the use of the instrument in solving specific problems.

Referring now to the drawings in greater detail, and particularly to Fig. 1 thereof, the reference character 10 indicates, in its entirety, a steam turbine which includes a rotor 11 made up of a plurality of discs 12 fixedly secured on a shaft 13 in axially-spaced relation and carrying at their peripheries annular rows of circumferentially-spaced blades or vanes 14. The shaft 13 also carries a disc 16, located upstream of the disc 12, considered in the direction of flow of stream through the turbine. This dsc 16 likewise carries peripheral blades or vanes 17, at the upstream sides of which are stationary nozzles 18 carried by the stator or casing 19 and serving to supply steam from the usual steam chest 21.

Passage of steam from the steam chest 21 to the nozzles 18 is controlled by the valve 22 and its associated mechanism 23, the latter being operated by the usual governor apparatus, indicated in its entirety by the reference character 25.

The casing 19 also carries stationary nozzle or vane structure 26, alternating with the plurality of axially-spaced discs 12.

The shaft 13 is journaled in bearings 27, and at the end remote from the governor 25 carries a coupling flange 28 secured to the mating coupling flange 29 of a driven mechanism, such as a generator (not shown), by an annular series of coupling bolts 30.

The rotor disc 16 is provided in its upstream face with an annular series of balance plug openings 32, each such opening being internally threaded for reception and retention of a threaded balance plug if the latter should be required at any time during the life of the turbine. The upstream end wall of the casing 19, adjacent to the governor 25, is provided with an access opening 33, axially aligned with the balance plug openings 32 as the latter move therepast upon rotation of the rotor 11. Thus, when a balance plug is to be placed in one of the balance plug openings 32, the rotor 11 is turned until the desired balance plug opening is aligned with the access opening 33, whereupon the balance plug may be inserted through the access opening. The access opening is normally closed by a closure plug 34.

Similarly, the last rotor disc 14 is provided in its downstream face with an annular series of balance plug openings 36 in which balance plugs may be inserted through an access opening 37, the latter normally being closed by the closure plug 38.

Referring now to Figs. 2, 3 and 4 of the drawings, the reference character 50 indicates, in its entirety, an instrument for determining and locating balance plug openings, comprising an outer annular protractor 51 bearing on both faces thereof an annular series of markings 52 indicative of degrees, these markings 52 being identified by rows A and B of numerals.

Mounted within the annular protractor 51 for rotation relative thereto is a disc 53 constituting a representation of the rotor being balanced. The side of the disc 53 shown in Fig. 2 represents the governor end of a turbine rotor, while the side shown in Fig. 3 represents the coupling end of the same rotor.

Each face of the disc 53 bears a plurality of annular series of markings 54, each series representing a different system of numbering balance plug openings. In the construction herein illustrated the disc 53 carries three annular rows C, D, and E of dots 54 representing balance plug openings 32 at the governor end of the rotor (Fig. 2) and balance plug openings 36 at the coupling end of the rotor (Fig. 3).

As indicated by the numerals adjacent each dot 54, row C is for use when the turbine rotor contains 36 balance plug openings at each end, row D when the rotor has 18 balance plug openings, and row E when there are 12 such openings at each end of the rotor. Obviously the disc 53 may bear additional rows of dots representing other numbers of balance plug openings, as may be found desirable.

Preferably both faces of the disc are provided with a series of arrow heads 56 indicating the direction of rotation of the rotor as viewed from that particular end.

A double straight-edge device is associated with the disc 53 and protractor 51 and includes an arm 58 at the governor side of the instrument and an arm 59 parallel to and spaced from arm 58 at the coupling side of the instrument, these two arms extending beyond the periphery of the protractor 51 at both of their ends and being secured in spaced apart relation by blocks 61. Both arms have a central enlargement 62 at their mid-points for reception of a bearing sleeve 63 extending axially of and secured to the disc 53 and mounting the straight-edge device for rotation with respect to said disc. The straight-edge 57 is so mounted relative to the bearing sleeve 63 that the edge 64 of the straight-edge always extends diametrically of the disc 53.

At the coupling side of the instrument 50 a second smaller disc 65 is mounted in overlying relation to the straight-edge 57 and is adjustably clamped against the adjacent end of the bearing sleeve 63 by threaded pin 66 and knurled finger piece 67.

This disc 65 constitutes a representation of the rotor coupling 28, as viewed from the coupling end of the turbine and as illustrated carries three annular rows F, G and H of dots 68 representing holes for the coupling bolts 30. The opposite side of disc 65 carries the same arrangement of dots 68, as if the dots were holes completely through the disc.

As indicated by the numerals adjacent the dots 68, the row F represents 16 bolt holes, the row G represents 12 bolt holes, and the row H represents 8 such holes. On the opposite side of the disc 65 (not shown) the numerals are arranged in the reverse orders. The disc may be reversed on the pin 66 so that it will correspond to the coupling bolt hole numbering used by the manufacturer of the turbine.

The instrument is utilized as follows: A piece of chalk is held against the rotating shaft 13 of the turbine 10 at the governor end. The unbalance in the rotor will result in a chalk mark X on a limited portion of the shaft periphery (Fig. 5). Assume that the rotor has 36 balance plug openings 32 and that the chalk mark X is at an angular location corresponding to the space between balance plug openings Nos. 24 to 28 (Fig. 5). The straight-edge 64 is positioned at the leading end of the mark, which, as indicated by the arrow heads 56, is at opening No. 24.

The protractor is rotated on the disc to bring 0 on the protractor under the straight-edge 64 and the latter is advanced 35 degrees (which number of degrees has been found by experimentation to produce accurate results) to the position indicated by the dot-dash line 64a.

Assuming that the chalk mark X was obtained while the rotor was rotating at high speed, a reading would be taken at the adjacent end 64b of the dot-dash line 64a, on row C where the answer is indicated as between openings 20 and 21. Consequently, a balancing plug should be positioned in either of these openings.

If the chalk mark were made while the rotor was turning at a low speed, the mark would appear at the opposite side of the coupling, as at X' in Fig. 5 between openings 6 and 10. Advancing the straight-edge 35 degrees from the leading end of the chalk mark X' the new position of the straight-edge is that indicated by the dot-dash line 64a. Inasmuch as this calculation is based on a low R. P. M. of the rotor during the chalk marking, the final answer is read at the opposite end 64b of the dot-dash line 64a, rather than at the now adjacent end 64c. Naturally, the answer is the same as previously obtained, with the balance plug going in either opening 20 or 21.

Figure 6:
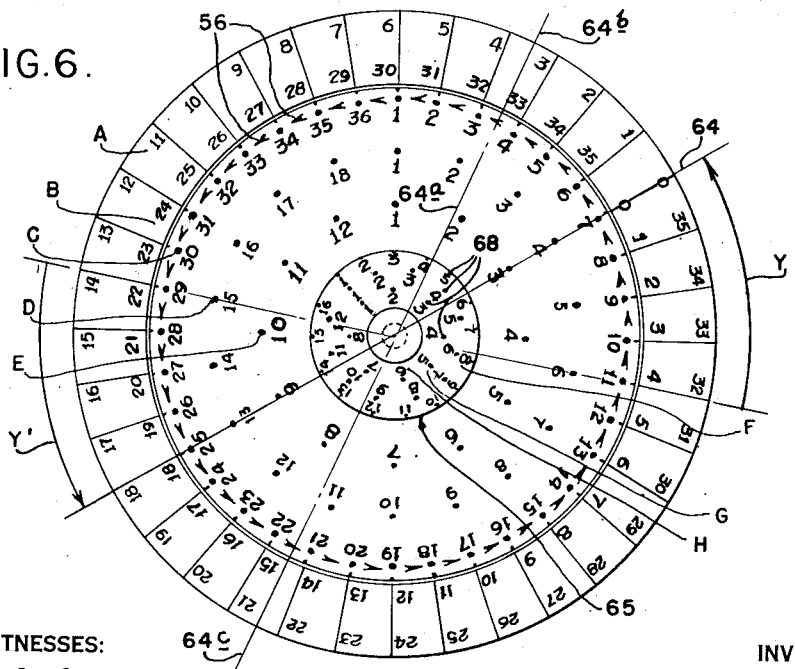

Referring now to the problem illustrated diagrammatically in Fig. 6, it is assumed that a chalk mark Y on the shaft 13 at the coupling end of the turbine was obtained at low speed rotation of the rotor and extends between openings Nos. 4 and 6, with a total of 18 openings in the annular series of coupling end balance plug openings 36. The arrow heads 56 indicate that the leading end of the mark Y is at opening No. 4, so the straight-edge is set at that position as indicated by the solid line 64 of Fig. 6. The protractor is turned to bring a reading of 0 at the straight-edge 64, and the latter then advanced 35 degrees to the position indicated by the dot-dash line 64a. Since the chalk mark Y was made at a low R. P. M. the reading is taken at the other end 64c of the dot-dash line 64a on row D with a result of opening No. 11. If the chalk mark were made at a high R. P. M. the chalk mark would be at the opposite side of the shaft, as at Y', and the result is read at the adjacent end 64c of the dot-dash line 64a, which indicates the plug should go in opening No. 11.

Inasmuch as the balance plug openings are concealed by the casing 19, it will be necessary to make use of the coupling disc 65 of the instrument. Data furnished by the manufacturer will indicate the relationship of the coupling bolt holes to the balance plug openings. For example, a particular turbine rotor may have 36 balance plug openings and 16 coupling bolt holes and the manufacturer's data or a check in the field may indicate that balance plug opening No. 28 is angularly aligned with coupling bolt hole No. 15 (see Fig. 6). Inasmuch as the coupling bolt hole numbering is always visible on the periphery of the coupling 28, alignment of the desired balance plug opening with the access opening through the casing may be readily obtained.

In the instrument 50, proper relationship of the coupling disc 65 and rotor disc 53 is obtained by loosening the knurled finger piece 67 and turning the coupling disc relative to the rotor disc.

It should be noted that the numbering on the governor side of the instrument is exactly the reverse of that on the coupling side. As a result, location of a given balance plug opening on either side automatically locates the same opening on the opposite side.

While the invention has been shown in but one form, it will be apparent to those skilled in the art that it is not so limited, but is susceptible of various changes and modifications, without departing from the spirit thereof.

What is claimed is:

1. In a device for determining which hole of an annular series of balance plug holes in a turbine rotor should receive a plug to balance a previously determined unbalance in said rotor; a primary disc having on a first side thereof representations of the annular series of balance plug holes being balanced, numbers associated with said representations and corresponding to the numbering of the rotor balance plug holes, a protractor with said primary disc at the periphery of the latter and rotatable relative thereto, a straight-edge element associated with the first side of the disc and rotatable about the axis of said disc with one of its edges always diametrically disposed with respect to the disc, and a secondary disc coaxial with the primary disc and adjacent said first side of the latter, said secondary disc being rotatable with respect to the primary disc and carrying representations of the annular series of bolt holes in the coupling of the rotor being balanced, the numbering of the representations on the secondary disc corresponding to the numbering of the bolt holes of the rotor coupling, and means for retaining the secondary disc in any desired position of rotation relative to the primary disc.

2. A location computing instrument for determining in which hole of an annular series of balance plug holes in a rotor a balancing plug should be inserted; comprising a first disc having indicated on a face thereof an annular series of marks indicative of balance plug holes and indicia associated with said marks corresponding to the indicia normally associated with balance plug holes, a protractor associated with said first disc and having indicated thereon markings indicative of degrees, an indicator rotatably adjustable relative to said first disc and having at opposite ends portions indicating edges diametrically opposed relative to the axis of the first disc, a second disc coaxial with the first disc and of materially lesser diameter than the latter and having indicated thereon an annular series of marks indicative of coupling bolt holes and indicia associated with said marks corresponding to the indicia normally associated with coupling bolt holes, means mounting said second disc for rotation relative to said first disc, and means for retaining said discs in a rotative relation where their respective annular series of points have the relation normally had by the coupling bolt holes and balance plug holes of a rotor.

WILLIAM L. DE WITT.

REFERENCES CITED

The following references are of record in the file of this patent:

UNITED STATES PATENTS

| Number | Name | Date |
| --- | --- | --- |
| 1,615,339 | Mayer | Jan. 25, 1927 |
| 2,067,068 | Taylor | Jan. 5, 1937 |
| 2,364,026 | Lundgren | Nov. 28, 1944 |